(Model.)
J. J. CLAYTON.
GRAIN DRILL AND CULTIVATOR.
No. 267,671. Patented Nov. 21, 1882.
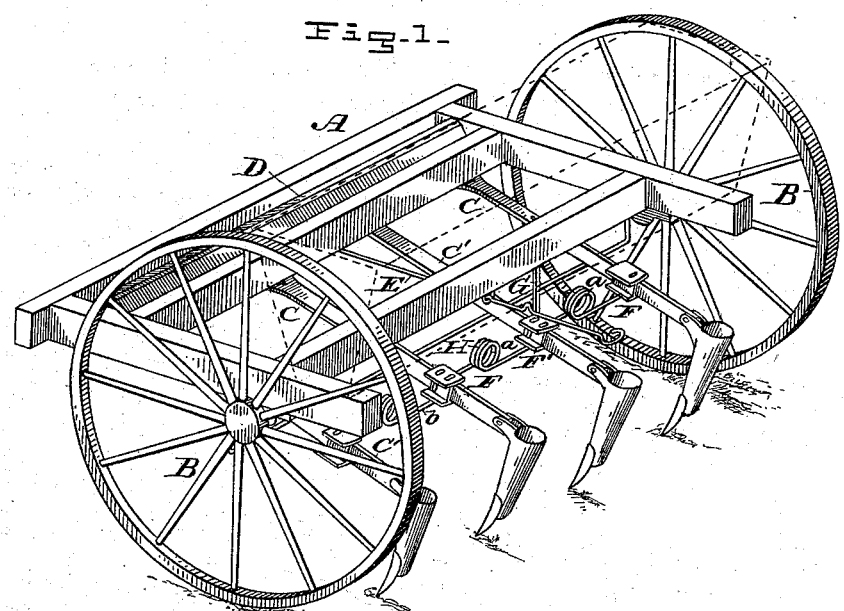
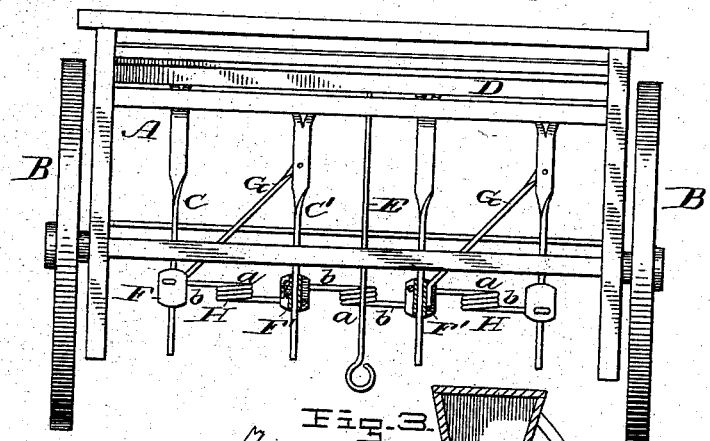
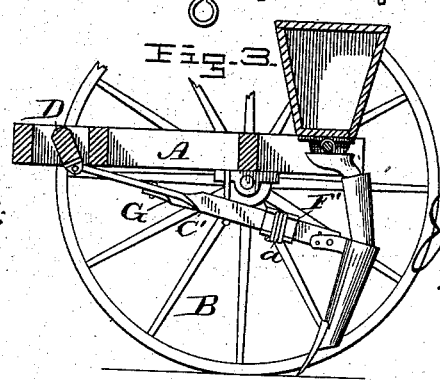
WITNESSES:
Jas. F. DuHamel
Walter S. Dodge.
INVENTOR:
John J. Clayton,
by Dodge & Son,
Attys.

UNITED STATES PATENT OFFICE.

JOHN J. CLAYTON, OF DAYTON, OHIO.

GRAIN-DRILL AND CULTIVATOR.

SPECIFICATION forming part of Letters Patent No. 267,671, dated November 21, 1882.

Application filed July 13, 1882. (Model.)

*To all whom it may concern:*

Be it known that I, JOHN J. CLAYTON, of Dayton, in the county of Montgomery and State of Ohio, have invented certain Improvements in Grain-Drills, Cultivators, and other Implements, of which the following is a specification.

My invention relates to grain-drills, wheel-cultivators, and like implements; and it consists in connecting the drag-bars one with another in such a manner that each assists in holding the others down to their work, and to prevent their being lifted out of the ground by clods and other obstacles.

The invention further consists in a novel manner of connecting the beams or drag-bars, whereby a proper amount of independent movement is permitted, as hereinafter fully explained.

In the accompanying drawings, Figure 1 represents a perspective view of a grain-drill embodying my improvements; Fig. 2, a top plan view, partly in section; Fig. 3, a vertical longitudinal section.

Under the common construction of implements of this class each drag bar or beam is free to rise and fall independently of the others, and as a consequence the hoes or shovels are being lifted out of the ground at short intervals throughout the operation of the machine. To overcome this difficulty I connect the drag bars or beams with each other in such manner that each shall be held down to its work by the others, but with a yielding or elastic pressure which will not prevent an individual drag-bar from rising when a large and dangerous obstruction is met with. This will be readily understood by referring to the annexed drawings, in which A represents the frame of the machine carried by wheels B, and C C' the drag-bars jointed or hinged to the cross timbers or irons of the frame in any usual or well known manner so that they may freely rise and fall.

It is now generally deemed desirable to so construct the machine that the shovels may be arranged in straight or zigzag lines, at pleasure, and to thus produce a "shifting-rank" machine. One half the drag-bars, C', are jointed to a swinging or rocking beam, D, journaled in the frame and adapted to swing back and forth at its lower edge, as shown in Fig. 3, a rod or lever, E, being furnished for moving said beam D, and notched to hold the beam as adjusted. Any common mechanism for shifting the hoes may, however, be employed in lieu of the above.

F F' represent a series of boxes, one of which is mounted upon each drag-bar, as shown. Those boxes F which are upon the stationary drag-bars C are fixed rigidly thereto; but the beams or drag-bars C' are free to slide through their boxes in order that the ranks may be shifted without moving the boxes.

To hold and support the boxes F' of the shifting drag-bars, I provide a brace, G, for each, attaching one end to the box to be held and the opposite end to the stationary drag-bar next thereto, as shown in Figs. 1 and 2. The boxes F F' are also connected, and the latter in part supported by intermediate spring-connections, H, each consisting of a central coil, $a$, and two laterally-projecting arms, $b$, which arms are firmly and rigidly attached to the boxes, as indicated.

In all particulars not specially set forth herein the machine may be of ordinary construction or otherwise, as desired, my invention relating only to the connection of the beams and to the means of connection explained and shown.

I desire to have it distinctly understood that I believe myself to be the first to connect a series of drag-bars or beams in such a manner that each assists in holding the other down to its work, and that I claim said idea, broadly, and without regard to the special connections employed. I also separately and further claim such special connections.

The invention is especially designed for use in grain-drills, but may also be applied to cultivators or like implements.

I am aware that a rigid bar or beam has been carried across a series of drag-bars, and said drag-bars connected therewith by clips; but such arrangement permits no independent play of the drag-bars, and therefore is undesirable.

Having thus described my invention, what I claim is—

1. In a grain-drill, a series of drag-bars arranged in groups, substantially as shown and described, and adjustable one group in relation to the other, and a series of intermediate connections, all combined substantially as set forth, whereby each drag-bar is caused to assist in holding down the others and the relative adjustment of the two groups of drag-bars is permitted.

2. In a cultivator, the combination of a frame, a series of drag-bars jointed to said frame at their forward ends, and separate intermediate connections, substantially such as shown, each extending from one drag-bar to the next and uniting the drag-bars in rear of their joints.

3. In combination with frame A and drag-bars C C', boxes F F' and braces G, applied substantially as shown.

4. In combination with frame A, drag-bars C C', and swinging beam D, boxes F F' and braces G, connecting the boxes F' with the drag-bars C.

5. In combination with beams C C', boxes F F' and springs H.

6. In combination with beams C C' and boxes F F', braces G and springs H, applied as shown.

7. In a grain-drill, a series of drag-bars united by intermediate flexible connections, whereby each beam is caused to assist in holding the others down to their work, but is permitted to yield independently of the others when a dangerous obstruction is encountered.

JOHN J. CLAYTON.

Witnesses:
   JOHN A. SHAUCK,
   EDWARD BRENEMAN.